Sept. 11, 1962 R. M. HENSEN ETAL 3,053,223
SPRAY HEAD FOR EGG OILING MACHINE
Filed Dec. 29, 1960 3 Sheets-Sheet 1

Raymond M. Hensen
Robert L. Sailor
INVENTORS

BY *Clarence A. O'Brien*
*and Harvey B. Jacobson*
Attorneys

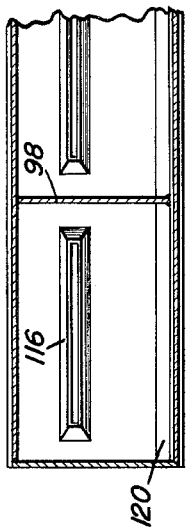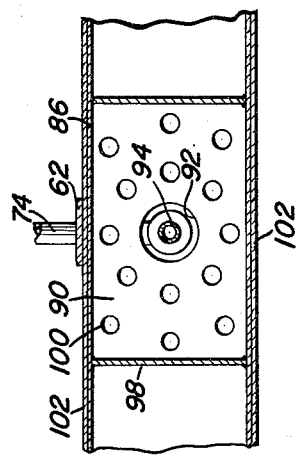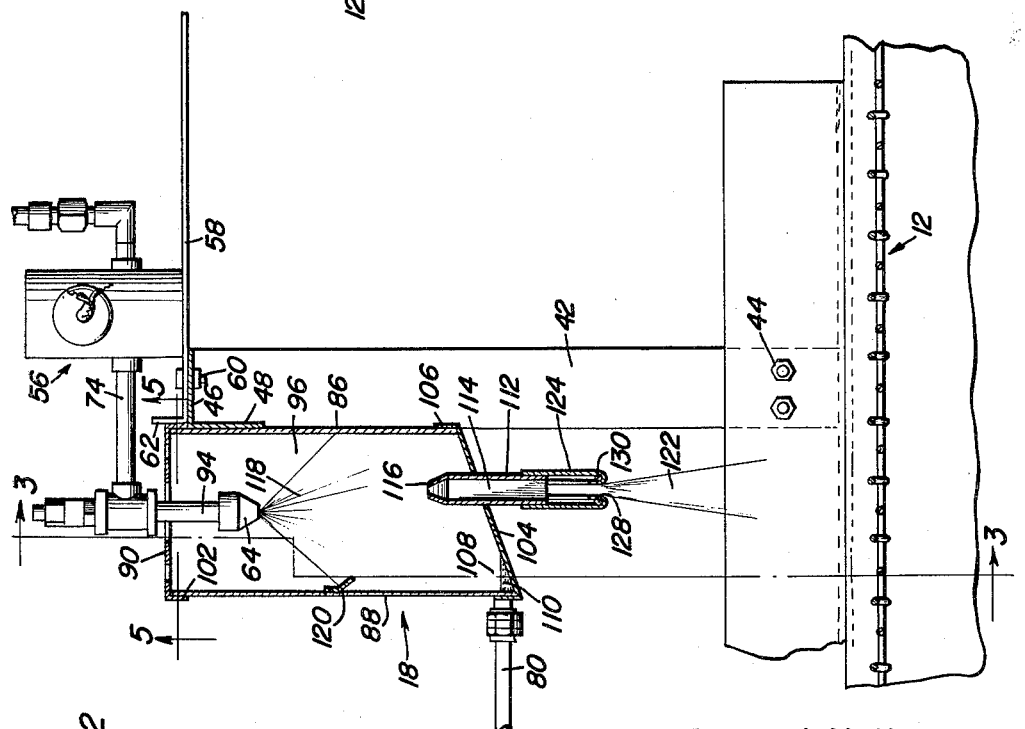

Raymond M. Hensen
Robert L. Sailor
INVENTORS

United States Patent Office 3,053,223
Patented Sept. 11, 1962

3,053,223
SPRAY HEAD FOR EGG OILING MACHINE
Raymond M. Hensen and Robert L. Sailor, Adrian, Minn., assignors to Food Saver Inc., Adrian, Minn., a corporation of Minnesota
Filed Dec. 29, 1960, Ser. No. 79,439
11 Claims. (Cl. 118—610)

The present invention relates to machines for treating the shell surface of eggs by applying an oil spray coating thereto.

The treating of egg shell surfaces has been a necessary practice in view of the necessity for storing eggs for a duration of time before consumption within which time egg spoilage or reduction in the quality or the freshness of the eggs will occur. Some of the principal factors in the quality deterioration of eggs are the escape of carbon dioxide and moisture from within the egg through the pores of the egg shell. Accordingly, by applying a coating of mineral oil to the shell surface, the pores thereof are sealed in order to reduce the porosity of egg shell surfaces which may be exposed to the air.

It is therefore a primary object of this invention to provide a machine which will apply a fine mist spray of mineral oil to exposed egg shell surfaces of eggs carried in egg tray cartons in order to reduce deterioration of the eggs and permit storage thereof for a reasonable length of time.

Another object of this invention is to apply a fine mist spray of oil to exposed egg shell surfaces of eggs carried in trays moved along on a conveyor belt in an efficient, neat and economical fashion.

A further object of this invention is to provide an oil spray machine for treating egg shell surfaces which machine is exceptionally versatile as to installation in that it may form part of a larger egg handling system or constitute a self-contained unit and may accommodate different numbers of eggs that may pass therethrough.

An additional object of this invention is to provide an egg shell oil spraying machine which is economical in operation, in that it will apply a uniform and regulated protective coating to the exposed egg shells without removal of the eggs from the tray carrying packaging so that the eggs need not be disturbed and wherein the controlled or regulated nature of the spray avoids the application of large undesirable globules of oil on the eggs or the tray carton.

A still further object of this invention is to provide an oil spray egg shell treating machine which applies a fine mist spray to the exposed egg shells so as to provide adequate protection therefor against marketing abuses and rapid quality deterioration without causing the egg shell surfaces to have an unnatural oily appearance.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a sectional view taken substantially through a plane indicated by section line 2—2 in FIGURE 1.

FIGURE 4 is a sectional view taken substantially through a plane indicated by section line 4—4 in FIGURE 3.

FIGURE 5 is a sectional view taken through a plane indicated by section line 5—5 in FIGURE 2.

Figure 1:
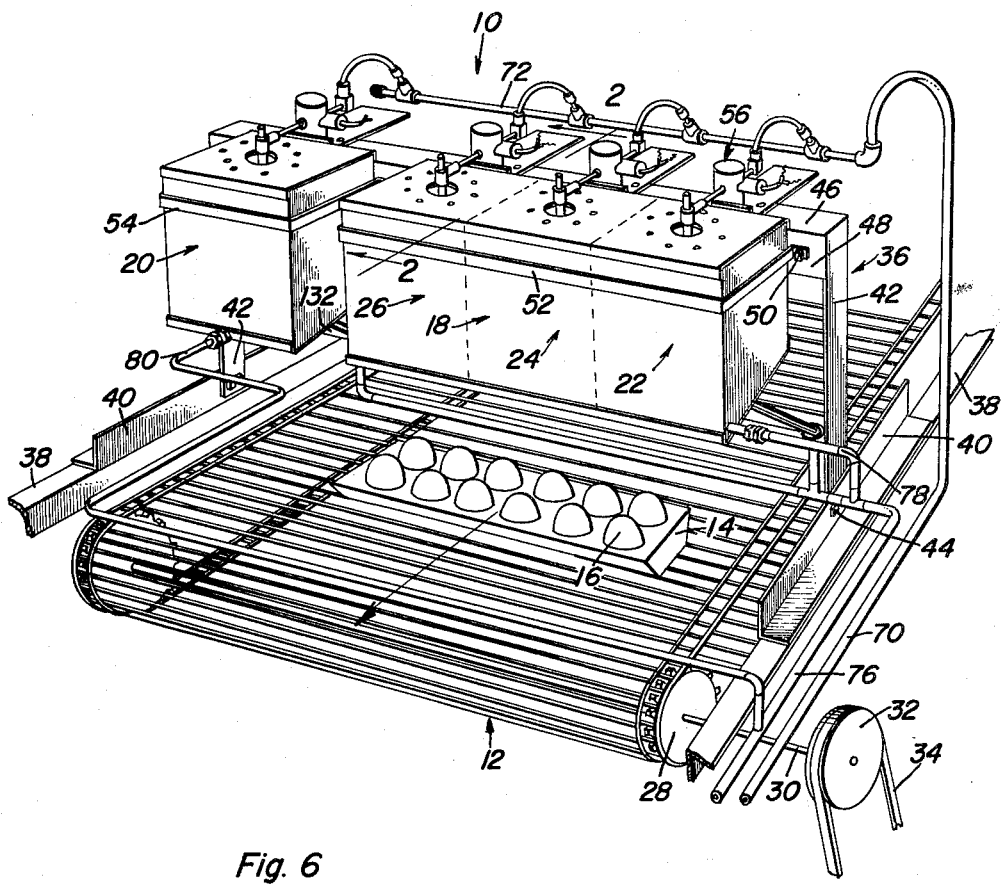
FIGURE 1 is a perspective view of an egg shell treating machine installation made in accordance with this invention.

Referring now to the drawings in detail, FIGURE 1 illustrates the egg shell treating machine of this invention which is generally referred to by reference numeral 10. It will be observed that the machine 10 includes a moving egg conveyor belt mechanism generally referred to by reference numeral 12 which moves thereon an egg crate tray 14 carrying eggs therein with the upper portions of the egg 16 being exposed above the tray 14 for oil spray treatment. Operatively mounted above the conveyor mechanism 12 is a set of gang spray head units generally referred to by reference numeral 18 as well as the single spray head unit 20. It will be observed therefore that in the exemplary illustration of FIGURE 1, the spray head set 18 is composed of three spray head units 22, 24 and 26. It will therefore be understood, that the lateral extent of the conveyor mechanism 12 will determine both the number of the spray head sets and the number of units within each spray head set inasmuch as the spray head units are arranged laterally across the top of the conveyor 12 for spraying eggs passing therebelow. By virtue of such an arrangement any particular design of the machine pursuant to the principles of this invention may be rendered extremely versatile in that different number of eggs may be accommodated by selectively operating any one or all of the sets of spray head units depending upon the number of and extent of the eggs alined therewith on the conveyor mechanism 12.

It will be observed that the conveyor mechanism 12 which may form a part of a larger egg handling system or may constitute part of a self-contained egg oiling unit is driven at one end by sprocket wheels 28 connected to a drive shaft 30 to which a drive pulley 32 is connected, the drive pulley 32 being driven from any suitable power source by any suitable driving connection such as the pulley belt 34. The oiling head units 20, 22, 24 and 26 are therefore mounted above the conveyor belt 12 by a suitable frame assembly generally indicated by reference numeral 36. The frame assembly is therefore secured to a pair of angle iron frame members 38 which may constitute part of the general machine frame whether the machine be a self-contained unit or a large egg handling system. Secured on the frame members 38 on opposite sides of the conveyor belt mechanism 12 by a pair of angle members 40 is the oiling head frame assembly 36 thereby anchored to the machine frame at any suitable location with respect to the conveyor belt mechanism 12. The frame assembly 36 therefore includes a pair of parallel upright members 42 fastened to the upstanding leg of the angle members 40 by suitable fasteners 44. The upright members 42 are interconnected by frame portions 46 and also interconnected by portion 48. The mounting portion 48 has anchored thereto by suitable fasteners 50 a strap member for mounting each of the sets of oil spray head units. The three unit set 18 is therefore secured to the frame assembly means of the strap member 52 while the single unit 20 is secured to the mounting member 48 by the strap member 54. It will also be observed that each of the oiling head units has associated therewith a solenoid controlled valve mechanism 56 which mechanisms 56 are each mounted on the mounting member 46 by means of a mounting plate 58 secured to the member 46 by fasteners 60 and having an upstanding flange 62 abutting against the oiling head unit for properly spacing the oiling unit with respect to the valve mechanism as more clearly seen in FIGURE 2.

Each of the oiling head units has associated therewith an oil spray nozzle 64 as seen for example in FIGURE 2.

Figure 6:
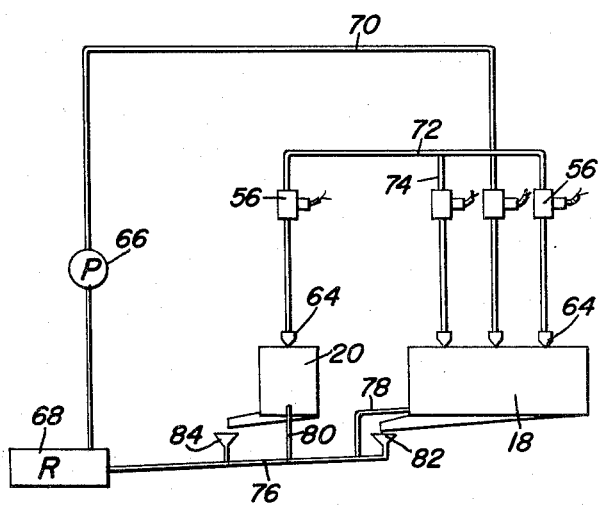
FIGURE 6 is a schematic diagram of the hydraulic system for the egg shell treating machine of this invention.

Oil is supplied to each nozzle 64 through the solenoid controlled valve mechanism 56. Suitable electrical controls are accordingly provided for selective operation of the solenoid control valve mechanism 56 so as to selectively admit oil under pressure to the spray nozzles 64. Referring threfore to FIGURE 6 in particular, it will be observed that a source of oil under pressure may be provided for supplying each of the spray nozzles 64 with the oil under pressure. In the example shown, a pump 66 draws oil from a reservoir 68 and supplies the oil through conduit 70 to a connecting conduit 72 to which the valve mechanisms 56 are connected in parallel by a plurality of short conduit sections 74. Also provided is a return line conduit 76 which is connected to the reservoir 68 and receives oil discharged from the oiling unit set 18 and single unit 20 for recirculating the oil received therefrom. A connecting conduit 78 accordingly connects unit set 18 to the return conduit means 76 while connecting conduit 80 connects the unit 20 to the return conduit 76. Also provided are discharge receptor cups 82 and 84 both connected to the return conduit 76 for receiving additional oil discharged from the multi-unit 18 and single unit 20 respectively. It will of course be understood that any other suitable source of oil under pressure may be provided for supplying oil to the spray nozzles 64 and other arrangements for removing the oils from the units 18 and 20 may be provided for pursuant to the teaching of this invention.

Figure 3:
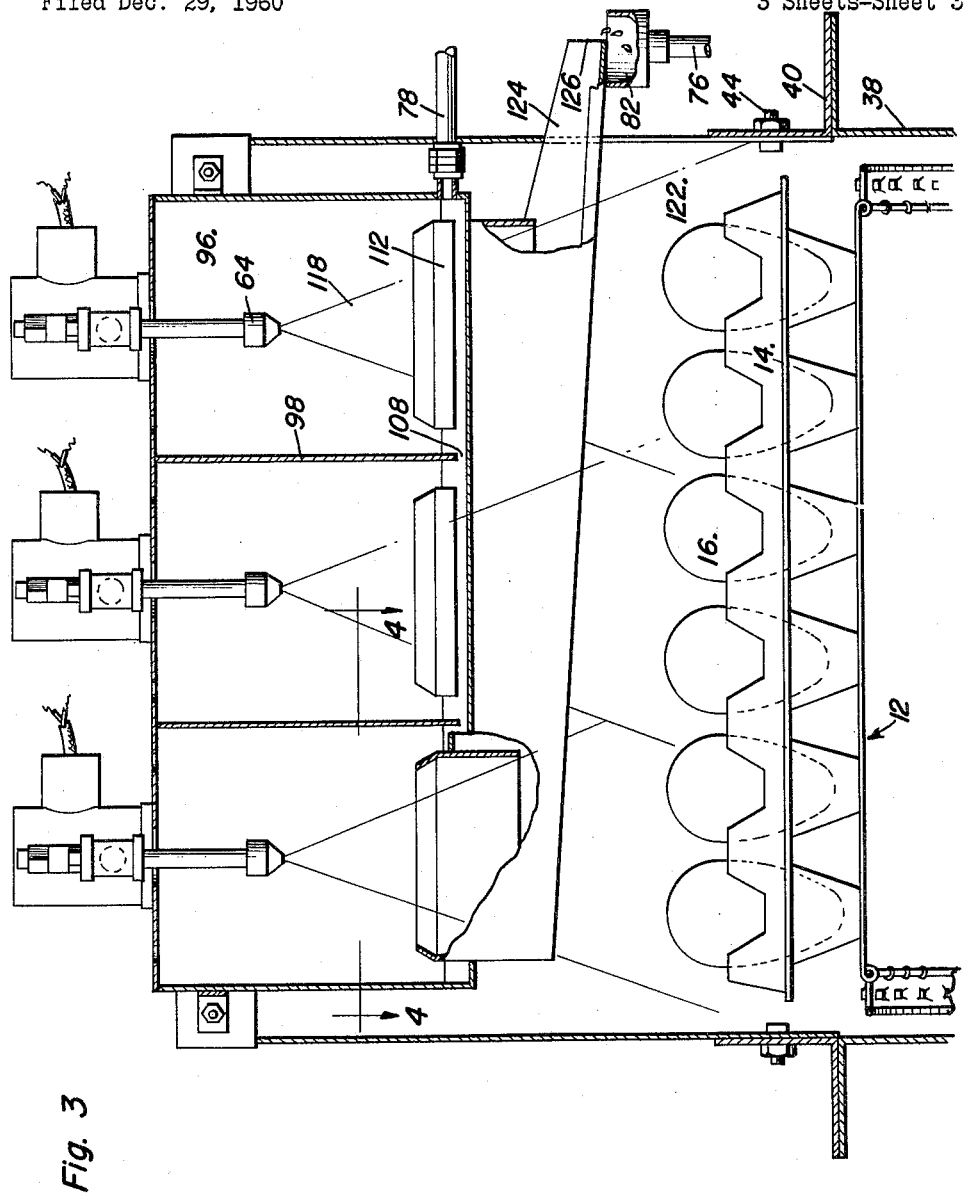
FIGURE 3 is a partial sectional view with other parts shown in section taken substantially through a plane indicated by section line 3—3 in FIGURE 2.

It will be apparent that the spray nozzles 64 are associated with each oil spray head unit, each of which units are similar in construction and arrangement. Unless otherwise specified, the description which follows with regard to an oil spraying head applies to each of the head units 20, 22 24 and 26. It will therefore be noted from FIGURE 2 in particular that each of the head units includes a rear wall 86 which is attached to the mounting member 48 of the frame assembly 36, a front wall 88 disposed parallel to the rear wall, a top wall 90 having a centrally located aperture 92 through which the connecting conduit 94 for the nozzle 64 extends so as to position the nozzle 64 within the spray confining chamber 96 which is defined between the rear, front and top walls of the oiling unit. It will also be observed from FIGURE 5 that side walls 98 are also provided for each unit. Also, a plurality of apertures 100 are disposed in the top wall 90 which may be secured in any suitable manner to the rear and front walls overlapping portions 102. It will also be observed from FIGURE 2 in particular, that the bottom portion of the chamber 96 below deflecting means 120 between the front, rear and side walls of each unit forms part of a spray confining chamber means with a bottom collection wall member 104 which is inclined downwardly toward the front wall 88 connected to the front, rear and side walls to form a liquid collection means. Overlapping portions 106 are also provided on the bottom wall 104 for securing the bottom wall to the rear and front walls of the unit. It will also be noted from FIGURES 2 and 3 that the side walls 98 of the multi-unit section 18 have provided therein an opening 108 at the lower front corner thereof so that the lower forward portion of the chambers 96 within each of the interconnected units 22, 24 and 26 are in communication with each other. It will therefore be apparent that by virtue of the inclination of the bottom wall, excess oil 110 will collect within the collection means of each chamber 96 and may be withdrawn from the chambers 96 which are interconnected by the openings 108 through the connecting conduit 78 which is connected to the return line 76. It will be noted that the conduit 58 is connected to one side of the multi-unit section 18 and in particular to the side wall of the unit 22 for drawing the collected oil 110 from all of the chambers inasmuch as the chambers are in communication with each other through the opening 108 in the side walls 98. With regard to the single unit 20, however, the conduit 80 may be connected to the front wall thereof adjacent the lower inclined portion of the bottom member 104.

A liquid spray receiving means 112 is provided for each of the units and defines a narrow lateral passage 114 which extends into the chambers 96 of each of the units. It will be noted that the restricted inlet ends 116 of the spray receiving means 112 is tapered inwardly toward the upper end thereof so as to receive spray droplets from the nozzle 64 of reduced size. Also, in connection with the reception of the reduced size droplet of the spray 118 emitted from the nozzle 64 within the chamber 96, it will be observed that the aforementioned deflecting means 120 is provided on the inside of the front wall 88 in order to redirect some of the spray 118 toward the inlet end 116 of the spray receiving means 112. Accordingly, the spray issuing from each of the nozzles 64 is confined within the chambers 96 of each of the units, a portion of which spray is deflected toward the outlet passage 114, the spray then being distributed parallel to a plane perpendicular to the direction of movement of the conveyor 12 above which the units are disposed. Accordingly, a portion of the spray 118 is distributed by the spray receiving means 112 onto the exposed egg shells 16, the final distributed and regulated spray being identified by reference numeral 122.

It will be observed that the lower outlet ends of each of the spray receiving means 112 of the multi-unit section 18 are interconnected in common by a discharge nozzle arrangement formed by a pair of downwardly depending outlet nozzle forming members 124 connected to and depending below the lower edges of each of the spray receiving means 112 to form an outlet opening less restrictive than inlet 116. It will be observed from FIGURE 3 that the members 124 are inclined downwardly toward a discharge end 126 disposed just above the return cup member 82 for discharging thereinto oil collected from the larger droplets formed from the oil passing through the outlet passage 114. Accordingly, each of the members 124 has disposed along the lower edges thereof upturned channel formations 128 within which the oil droplets 130 are collected and discharged into the cup 82. While a single pair of members 124 are connected in common to each of the three spray receiving means 112 of the multi-unit section 18, a single such pair of outlet nozzle members 132 will be provided for the single unit 20 which outlet nozzle members 132 similarly cooperate with the discharge cup 84 associated therewith.

From the foregoing description, operation and use of the egg oiling machine of this invention will be apparent. It will therefore be appreciated, that the sprays 118 issuing from the spray nozzle 64 are not merely permitted to indiscriminately spray the entire area therebelow as was heretofore done, causing non-uniform coating of the exposed egg shells and giving them an oily and unsightly appearance, but by virtue of the novel spray head unit will distribute the spray and regulate the droplet size thereof as well as to regulate the amount of spray directed onto the egg shell surfaces disposed therebelow so as to protectively coat the egg shell surfaces with a uniform spray controlled coating as a result of which the eggs will not have an unsightly oily appearance. The excess oil collected both from the head chambers 96 and from the outlet spray nozzle members 124 and 132 may also be recirculated for re-use rendering operation of the machine even more economical. Also, by the arrangement of the spray head unit either singly or in multiples, the machine may be used to varying extent without any waste regardless of the extent to which the machine is to be used.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In an egg shell treating machine, the combination of an egg conveyor means operatively mounted for moving egg carrying trays with egg shells exposed thereabove and a precision liquid spray head unit operatively positioned above the conveyor means for spraying the egg shells in the trays comprising, selectively controlled spray nozzle means mounted in vertically spaced relation above the conveyor means, spray confining chamber means within which said nozzle means is disposed and liquid spray receiving means mounted in said chamber means and extending therebelow above the conveyor means for removing larger liquid droplets from the spray and directing a confined portion of the spray onto the exposed egg shells in the trays whereby spray droplet size, distribution and quantity is regulated, a source of liquid under pressure operatively connected to said spray nozzle means, liquid return means operatively connected to said liquid spray receiving means and source for recirculating liquid removed from the spray to regulate the quantity of spray, liquid collection means disposed in said chamber means and conduit means operatively connecting said collection means to the return means, and spray deflecting means mounted within said chamber means for redirecting a portion of the spray toward said spray receiving means, said spray receiving means comprising passage means extending laterally across said conveyor means and vertically into and below said chamber means, restricted inlet means connected to the passage means along its upper end within the chamber means for accepting spray droplets of reduced size and less restrictive outlet nozzle means connected to said passage means along its bottom end below the chamber means.

2. The combination of claim 1, wherein said outlet nozzle means is inclined downwardly with respect to one lateral side of the passage means terminating in a lower discharge end disposed above said return means.

3. The combination of claim 2, including liquid droplet collecting channel means mounted within and entirely along lower downwardly inclined edges of said outlet nozzle means for gravity discharge of liquid collected from the spray emitted through the nozzle means at the discharge end of the nozzle means into the return means.

4. The combination of claim 3, wherein said liquid collection means includes a downwardly inclined bottom member connected to a lower side of the chamber means, said conduit means being connected to the chamber means adjacent to a lower portion of the bottom member.

5. The combination of claim 4 including a plurality of separate sets of different numbers of interconnected spray head units operatively positioned with respect to each other laterally across said conveyor means for spraying any desired lengths of egg-carrying trays aligned laterally across the conveyor means parallel to the spray receiving means of each spray head unit.

6. In an egg shell treating machine, the combination of an egg conveyor means operatively mounted for moving egg carrying trays with egg shells exposed thereabove and a precision liquid spray head unit operatively positioned above the conveyor means for spraying the egg shells in the trays comprising, selectively controlled spray nozzle means mounted in vertically spaced relation above the conveyor means, spray confining chamber means within which said nozzle means is disposed, liquid spray receiving means mounted in said chamber means and extending therebelow above the conveyor means for removing larger liquid droplets from the spray and directing a confined portion of the spray onto the exposed egg shells in the trays whereby spray droplet size, distribution and quantity is regulated, said spray receiving means comprising passage means extending laterally across said conveyor means and vertically into and below said chamber means, restricted inlet means connected to the passage means along its upper end within the chamber means for accepting spray droplets of reduced size and less restrictive outlet nozzle means connected to said passage means along its bottom end below the chamber means.

7. The combination of claim 6, wherein said outlet nozzle means is inclined downwardly with respect to one lateral side of the passage means terminating in a lower discharge end.

8. The combination of claim 7, including liquid droplet collecting channel means mounted within and entirely along lower downwardly inclined edges of said outlet nozzle means for gravity discharge of liquid collected from the spray emitted through the nozzle means at the discharge end of the nozzle means.

9. The combination of claim 6, including liquid collection means disposed in said chamber means and conduit means operatively connecting said collection means to the return means.

10. In an egg shell treating machine, the combination of an egg conveyor means operatively mounted for moving egg carrying trays with egg shells exposed thereabove and a precision liquid spray head unit operatively positioned above the conveyor means for spraying the egg shells in the trays comprising, selectively controlled spray nozzle means mounted in vertically spaced relation above the conveyor means, spray confining chamber means within which said nozzle means is disposed and liquid spray receiving means mounted in said chamber means and extending therebelow above the conveyor means for removing larger liquid droplets from the spray and directing a confined portion of the spray onto the exposed egg shells in the trays whereby spray droplet size, distribution and quantity is regulated, liquid collection means disposed in said chamber means and conduit means operatively connecting said collection means to a return means, said liquid collection means including a downwardly inclined bottom member connected to a lower side of the chamber means, said conduit means being connected to the chamber means adjacent to a lower portion of the bottom member.

11. The combination of claim 6, including a plurality of separate sets of different numbers of interconnected spray head units operatively positioned with respect to each other laterally across said conveyor means for spraying any desired lengths of egg-carrying trays aligned laterally across the conveyor means parallel to the spray receiving means of each spray head unit.

References Cited in the file of this patent

UNITED STATES PATENTS

| | | |
|---|---|---|
| 2,035,677 | Steinke | Mar. 31, 1936 |
| 2,052,354 | Koplin | Aug. 25, 1936 |
| 2,801,606 | Hensen | Aug. 6, 1957 |